D. T. Evens,
Dental Articulator.
Nº 1,743. Patented Aug. 28, 1840.
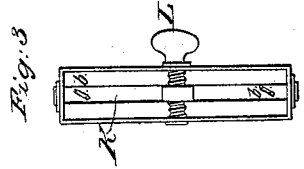
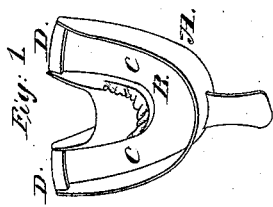
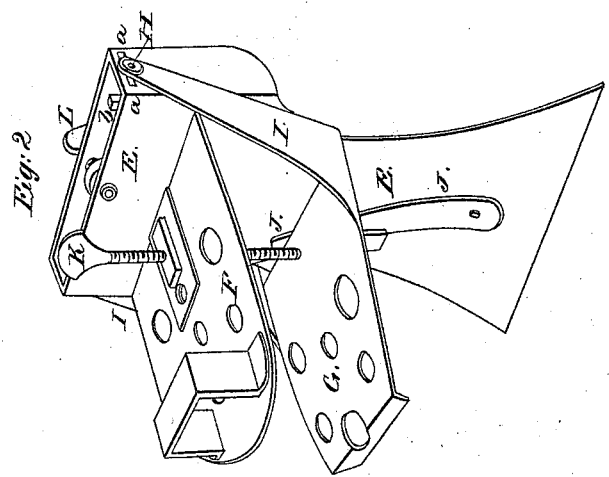

UNITED STATES PATENT OFFICE.

DANIEL T. EVENS, OF PHILADELPHIA, PENNSYLVANIA.

APPARATUS FOR OBTAINING CASTS FROM THE TEETH AND GUMS AND THE MODE OF ADJUSTING THE CASTS WHEN TAKEN.

Specification of Letters Patent No. 1,743, dated August 28, 1840.

*To all whom it may concern:*

Be it known that I, DANIEL T. EVENS, of the city of Philadelphia in the State of Pennsylvania, have invented an improvement in the manner of and the apparatus for taking a cast from the teeth and gums in the practice of dentistry, the improved apparatus invented by me being denominated the "Dentist's Guide;" and I do hereby declare that the following is a full and exact description thereof.

This apparatus consists in an improved mouth mold, which is to be filled with wax, that a perfect impression of the teeth and gums may be taken by allowing the jaws to close upon it; after which the impression so made is to be filled with plaster of Paris, and this, while in a soft state, is to be placed between plates of metal in an instrument made to open and close in the manner of the mouth; a portion of the plaster being placed upon said metallic plates, for the purpose of attaching the two portions of the cast thereto in a manner to be presently described.

Figure 1, in the accompanying drawing, is the improved mouth-mold, which is similar in form to the mouth-molds heretofore used, but differs from them in the following important particular. In the ordinary mouth-mold, the exterior plate A, and the interior part B, are connected together by a metallic partition, or plate, extending entirely along the part C, C, between the parts A, and B; and when the mold is to be used it is filled in with wax on both sides of the plate occupying the space C, C, and in using it the upper teeth are brought into contact with one side of the plate, and the lower teeth with the opposite side. In constructing this instrument I leave it entirely open at the part C, C, and connect the two parts A, and B, together by strips of metal D, D, which are so situated as to be back of the molars when placed in the mouth, and offer no obstruction, therefore, to the closing of the teeth. In consequence of this, when the mold is filled with wax, and the teeth and gums forced into it, the teeth come into contact with, or lap over, each other, as they do in the ordinary closing of the jaws, and a cast taken therefrom will show the teeth in their natural positions.

Fig. 2, is an instrument in which the casts, or impressions, of the teeth and gums are to be received, and which is so constructed as to imitate the motion of the lower jaw, and to exhibit the actual relationship of the upper and lower teeth and gums to each other in the most perfect manner. E, E, is the back plate of the instrument, and to this the plate F, is attached at right angles, by soldering, or otherwise. G, is a similar plate, situated below the plate F, and connected with the upper part of the back plate E, E, by joint pins, one of which is shown at H; the rising side pieces I, I, making a part of the plate G, serve to give to said plate a motion analogous to that of the lower jaw in opening. K, is a tempering screw passing through a female screw in the plate F, and bearing on the plate G, so as to regulate its distance. J, is a spring bearing against the back edge of the plate G, and serving to throw it up, and keep it in contact with the tempering screw.

When the impression has been taken in the soft wax with which the mouth-mold has been filled, plaster of Paris, duly prepared is run into the impression on either side, and a portion of prepared plaster is also to be put upon the interior surfaces of the plates F, and G, and before the plaster has set on either part, the mouth-mold is placed in a proper situation between the plates F, and G. The holes seen in these plates serve to key the plaster, and to fix the casts in their proper positions. When the plaster has set completely, the whole is to be placed before a fire, or in some warm situation, to soften the wax, which will admit of the removal of the mouth-mold, and leave the casts attached to the plates.

As in closing the jaws it will sometimes happen that the teeth will not be made to meet in a perfectly natural manner, and the casts, therefore, would be subject to this defect were not provision made for adjusting the lower plate by allowing a motion at the joints H, similar to that which is admitted by the condeloid processes in the living subject; an arrangement has been made for effecting this object, which is shown in Fig. 3, representing a top view of the apparatus at the upper part of the plate E, E. K, is a bar of iron; upon the ends of which are the joint pins H, which pass through slots *a, a,* Fig. 1. L, is an adjusting screw by which the bar K, and, consequently, the plate G, can be moved backward and forward. The bar K, has some lateral play upon the adjusting screw L, thus admitting either end of the bar to be placed somewhat in advance of the other, so as to give a cant to the plate G, toward either side; b, b, are small thumb screws for holding the bar K, in its proper position.

Having thus fully described the nature of my dentist's guide, and shown the manner in which the same is to be used, what I claim therein as constituting my invention, and which I desire to secure by Letters Patent, is—

1. The manner of constructing the mouth-mold without a dividing plate, so as to admit of the meeting of the teeth, and of their lapping over each other, in taking the impression, as herein set forth.

2. I claim the manner of constructing and combining the apparatus of plates for receiving and holding the casts, in plaster from the teeth and gums; said apparatus being furnished with a movable plate, the action of which is similar to that of the lower jaw in the living subject; the respective parts of said apparatus being constructed, combined, and adjusted, substantially in the manner herein fully described.

In testimony whereof, I hereunto set my hand this sixteenth day of June, in the year 1840.

D. T. EVENS.

Witnesses:
　THOS. P. JONES,
　FOWLER M. RAY.